(12) United States Patent
Rice

(10) Patent No.: US 12,221,996 B2
(45) Date of Patent: *Feb. 11, 2025

(54) FASTENER SYSTEM

(71) Applicant: BPC LG 2, LLC, Charlotte, NC (US)

(72) Inventor: Donald Wayne Rice, Ripley, NY (US)

(73) Assignee: BPC LG 2, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,602

(22) Filed: Aug. 18, 2023

(65) Prior Publication Data

US 2023/0392642 A1 Dec. 7, 2023

Related U.S. Application Data

(63) Continuation of application No. 17/559,387, filed on Dec. 22, 2021, now Pat. No. 11,732,745, which is a continuation of application No. 15/989,131, filed on May 24, 2018, now Pat. No. 11,209,041, which is a continuation-in-part of application No. 15/595,620, filed on May 15, 2017, now abandoned.

(60) Provisional application No. 62/561,454, filed on Sep. 21, 2017, provisional application No. 62/553,190, filed on Sep. 1, 2017, provisional application No. 62/510,495, filed on May 24, 2017.

(51) Int. Cl.
*F16B 39/34* (2006.01)

(52) U.S. Cl.
CPC .................................. *F16B 39/34* (2013.01)

(58) Field of Classification Search
CPC ........ F16B 37/02; F16B 37/047; F16B 37/12; F16B 39/284; F16B 39/2825; F16B 39/34; F16B 39/36; F16B 39/38; Y10S 411/929; Y10S 411/947

USPC ......................... 411/259, 262, 301–303, 305
See application file for complete search history.

(56) References Cited

U.S. PATENT DOCUMENTS

| 1,422,027 A | 2/1890 | Marshall |
| 1,939,124 A | 11/1909 | Davies |
| 1,787,114 A | 12/1930 | Lelean et al. |

(Continued)

FOREIGN PATENT DOCUMENTS

GB           968448 A      9/1964

OTHER PUBLICATIONS

Helical Wire Inc., Products Catalog, Jul. 26, 2015, <https://web.archive.org/web/20150726110629/http://helicalwire.com/wp-content/uploads/2014/10/ Helical-Wire-Products-Catalog.pdf> (year 2015).

(Continued)

*Primary Examiner* — Roberta S Delisle
(74) *Attorney, Agent, or Firm* — Dawsey Co, LPA; David J. Dawsey

(57) ABSTRACT

A fastener system including a nut body and a helical thread insert. The nut body having an internally threaded bore containing a plurality of bore threads, and at least one bore obstruction. The helical thread insert formed to create a plurality of internal HTI threads and a plurality of external HTI threads, with the helical thread insert received in the internally threaded bore and not occupying all of the plurality of bore threads, and having its movement limited by the bore obstruction. The helical thread insert having threads with both circular end profiles and a non-circular end profile. The non-circular end profile including at least three straight segments, and located between circular threads.

20 Claims, 11 Drawing Sheets

(56) References Cited

U.S. PATENT DOCUMENTS

| | | | |
|---|---|---|---|
| 2,365,433 A | 12/1944 | Polizzi | |
| 2,403,810 A | 7/1946 | Le Barron | |
| 2,745,457 A | 5/1956 | Lang | |
| 2,775,281 A | 12/1956 | Smith | |
| 2,825,379 A | 3/1958 | Becker | |
| 2,869,224 A * | 1/1959 | Forster | F16B 33/02 |
| | | | 29/240.5 |
| 2,874,741 A * | 2/1959 | Brancato | F16B 37/12 |
| | | | 411/262 |
| 3,129,742 A | 4/1964 | Faroni et al. | |
| 3,177,782 A * | 4/1965 | Sampson | F16J 1/12 |
| | | | 411/262 |
| 3,272,250 A * | 9/1966 | Hattan | F16B 39/28 |
| | | | 411/262 |
| 3,444,915 A | 5/1969 | Gerhardt et al. | |
| 3,459,248 A * | 8/1969 | Waller | F16B 39/36 |
| | | | 411/262 |
| 3,945,070 A * | 3/1976 | Hauser | B22D 19/06 |
| | | | 65/282 |
| 5,032,047 A | 7/1991 | Theakston | |
| 5,080,544 A | 1/1992 | Bruyere | |
| 5,207,543 A | 5/1993 | Kirma | |
| 5,360,303 A | 11/1994 | Behrens et al. | |
| 5,702,217 A | 12/1997 | Charbonnel et al. | |
| 6,015,251 A | 1/2000 | Chung | |
| 6,494,659 B1 | 12/2002 | Lutkus et al. | |
| 6,726,422 B2 | 4/2004 | Giannakakos | |
| 8,998,548 B2 | 4/2015 | Kousens | |
| 9,845,822 B2 | 12/2017 | Pailhories | |
| 11,732,745 B2 * | 8/2023 | Rice | F16B 33/006 |
| | | | 411/305 |
| 2001/0014263 A1 | 8/2001 | Giannakakos | |
| 2003/0086772 A1 | 5/2003 | Giannakakos | |
| 2004/0120789 A1 | 6/2004 | Masuda | |
| 2008/0277932 A1 | 11/2008 | Grubert et al. | |
| 2009/0056101 A1 | 3/2009 | Cuddy et al. | |
| 2009/0200418 A1 | 8/2009 | Beaufort | |
| 2010/0221087 A1 | 9/2010 | Gillis | |
| 2011/0176887 A1 | 7/2011 | Im | |
| 2012/0315107 A1 | 12/2012 | Friedrich et al. | |
| 2013/0276287 A1 | 10/2013 | Thommes et al. | |
| 2014/0023453 A1 | 1/2014 | Hollensen | |
| 2015/0010373 A1 | 1/2015 | Cho | |
| 2018/0009543 A1 | 1/2018 | Journade et al. | |
| 2022/0275823 A1 | 9/2022 | Rice | |

OTHER PUBLICATIONS

NASM 8846, Revision 1, Insert, Screw-Thread, Helical Coil, National Aerospace Standard, Aerospace Industries Association, 2011 (Year: 2011).

Reasons to use Helicoil, Eureka Magazine, Apr. 7, 2016, <https://web.archive.org/web/20160407092058/https://www.eurekamagazine.co.uk/design-engineering-products/reasons-to-use-helicoil/115996/> (Year: 2016).

The Evaluation of Some Threaded Inserts, AFML-TR-78-107, Air Force Materials Laboratory, Oct. 1979, Table 58 ( p. 98) (Year: 1979).

NAS 577, Revision 16, Barrel Nut, National Aerospace Standard, Aerospace Industries Association, 2011 (Year: 2011).

Wire Thread Inserts, Power Coil (Borda), Mar. 2, 2016, <https://web.archive.org/web/20160302203437/https://www.powercoil.com.au/category/wire-thread-inserts/> (Year: 2016).

* cited by examiner

FASTENER SYSTEM

CROSS-REFERENCE TO RELATED APPLICATIONS

This application is a continuation of U.S. patent application Ser. No. 17/559,387, filed on Dec. 22, 2021, which is a continuation of U.S. patent application Ser. No. 15/989,131, filed on May 24, 2018, which claims priority to U.S. Provisional Patent Application Ser. No. 62/510,495, filed May 24, 2017, U.S. Provisional Patent Application Ser. No. 62/561,454 filed Sep. 21, 2017, U.S. Provisional Patent Application Ser. No. 62/553,190 filed Sep. 1, 2017, and U.S. patent application Ser. No. 15/595,620 filed, May 15, 2017, the disclosures all of which are hereby incorporated by reference.

STATEMENT REGARDING FEDERAL GRANTS

Not Applicable.

BACKGROUND

The present disclosure relates to a new type of nut where a helical wire insert that is used as part of a nut, along with a retained cap to lock a fastener in place. In a preferred embodiment, the new fastener provides a new category of threaded nuts for fasteners.

Locking fasteners are widely used in attaching equipment to the structure of a wide variety of machinery and vehicles. In one example, locking fasteners are used in an airframe, including for attaching parts to an aircraft fuselage. Other examples include installations in a variety of vehicles, such as automobiles, agricultural equipment, construction equipment, railroad equipment, trucks, trains, military vehicles and weapon systems, defense, space craft and for many other commercial vehicles, (e.g., tractors, earth moving equipment, conveyor systems, yard equipment) and the like. In particular, aircraft jet engines are often attached to the airframe with barrel nuts that include a locking feature. In addition, the same or similar fasteners are used in a variety of situations, such as industrial equipment, farm equipment and other equipment where vibration and motion control is required.

Existing locking fasteners are generally classified as using either a "prevailing torque" locking system, or using a "positive lock" locking system. Prevailing torque fasteners typically will utilize some structure that allows a threaded fastener to be advanced, i.e. tightened, to a particular torque, and then the locking structure retards the reverse backing out of the threaded shaft. A common prevailing torque fastener implements a plastic insert in the cap of a nut, with the insert bearing against the threaded shaft. The resilient nature of the plastic insert bears against and retards the backing out of the threaded shaft until a torque sufficient to overcome the prevailing torque is applied. The application of prevailing torque nuts with a resilient insert of Vespel™ material has achieved wide implementation in aircraft, despite the limitations of this particular prevailing torque locking fastener.

Positive lock locking fasteners are represented by a physical barrier to the backing out of a threaded shaft in a fastener system. A common example of a positive lock is the insertion of an appropriately sized cotter pin in a cross bored hole through a shaft that prevents advance of a fastener along a threaded shaft, either with a castellated nut or nut cap, or without an accompanying cap.

Vespel™ inserts are made from a polymide material and are often used with locking or self-locking fasteners. Available fastener systems are generally less than fully acceptable because of the available locking inserts are expensive and installation of a locking insert, such as a Vespel™ insert, is often difficult. An additional difficulty in using such inserts is that the bolt fasteners must be driven into the insert to maintain the specified torque tolerance when used in an environment that imposes a wide range of temperatures and vibration patterns. For purposes of reliability and safety a positive locking mechanism is considered important. Currently, the only effective locking or retaining system available for aircraft us is a collar made of resilient material, such as Dupont Vespel™. Commonly Dupont Vespel SP polymide components are machined or cut into a disk shape and then inserted as a collar around a fastener nut.

Locking fasteners which use inserts such as resilient inserts formed of Vespel™ have many limitations. Importantly, such inserts are expensive, as the plastic material must be approved by OEM users and the proprietary material in Vespel™ cannot be substituted by unapproved alternatives from third parties. The use of resilient inserts also has many issues such as a) the inserts are easily-damaged during installation b) the inability to reuse resilient inserts for reinstallation of components, and c) the limitation to the shape of fasteners when using a resilient collar. These current systems are generally limited, and could be substantially improved with an alternative substitute to a resilient insert fastener. Another disadvantage of existing systems is the limited number of cycles of insertion and removal that are within specified limits. Furthermore, there is an undesired inconsistency between torque values between the early cycles of use, and when the fastener is finally replaced. It is a goal of certain specifications that torques have limited variability over 15 cycles including prevailing torque and breakaway torque.

A variety of threaded inserts have been available for the last 50 years. One example of a threaded insert was invented by the Heli-Coil Corporation of Long Island, New York. A "heli-coil" insert was generally utilized to repair damaged threads in a complex part, such as an engine block, that could not be easily be replaced or would be unreasonable to replace due to a single damaged thread. With heli-coil type insert, the existing threads are drilled out and the hole is retapped for the threaded insert. After insertion of the threaded insert, the original thread geometry can be recreated by the insert. One example of the helicoil type thread insert is disclosed in U.S. Pat. No. 2,607,259 by J. O. Forster, issued Aug. 19, 1952.

Another example of a threaded insert is the "Spiralock"™ fastener, available from Stanley Engineered Fastening of New Britain Connecticut. The spiralock-type fastener provides an insert that serves to retain an inserted male fastener so long as the fastener is driven to have an assembly clamp load. Spiralock-type fasteners are not considered a prevailing torque locking fastener, because there is no locking action if the terminal torque requirement is not maintained.

There is a continuing need for specialized fasteners that function to retain a male thread through a range of insertion, even if a terminal torque is not maintained. In essence it is highly desirable for the male fastener to be inhibited from backing out and completely releasing from the fastener. Typically the nut or female fastener backs off the bolt portion of male fasteners, while the nut usually rotates off the bolt, while the bolt remains in a stationary position.

Further, it is desirable to provide an insert that provides reusable threads, and an insert providing threads that are stronger than the parent material, and that increase the strength of parent material, thread insert, and fastener combination over the net strength without the thread insert. A thread insert will have a larger diameter than the male fastener and thus provides an increase in the bearing area of the fastener.

Other previous attempts in the aircraft industry to improve on locking fasteners have resulted in a variety of fasteners, each of which have certain limitations. For example, U.S. Pat. No. 5,127,782 issued Jul. 7, 1992 discloses a fastener system as a self locking castellated nut.

For instance, the Shur-Lok "Sta-Lok"™ system is approved for use in aircraft such as helicopters, and utilizes a series of small serrations to hold a fastener nut in place after being torqued to a give specification.

An improved fastener system is desired by manufacturers and retrofitters to reduce the cost of current fasteners, and it is also desirable to enable labor savings along with improved assembly processes, and improved maintainability, reparability, overhauling, fastener reliability and strength.

SUMMARY

The present disclosure relates to a new type of nut comprising a helical thread insert as part of a nut body, along with a retained clasp to lock a fastener in place. In a preferred embodiment, the new fastener provides a new category of threaded nuts for fasteners.

The present disclosure is embodied in a fastener comprising a nut body and an associated Lockone clasp. The Lockone clasp may be maintained in its association by one or more Lockone clasp retainers, with said retainers essentially formed as a clip projecting a face of the nut body and disposed pawl shaped clips, affixed to the nut body, and arrayed about an arc about the edge of the thread bore. In a preferred embodiment, there are two or more retainers, or three or more or a series of one or more retainers forming an arc and another retainer spaced apart. The retainers hold a Lockone clasp in association with the nut body, and allowing for the clasp to flex about the nut body relative to the clasp thread ring. The nut body is formed with an internally threaded thread bore with said internal threads, partially filled by helical thread insert. In a preferred embodiment the helical thread insert is a locking helically wound wire thread insert. In another preferred embodiment the helical thread insert is a free running helically wound wire thread insert.

In another embodiment, the disclosure provides for a method of manufacturing a fastener comprising a nut complementary with a threaded shaft comprising providing a fastener that includes a nut with a thread bore internally threaded to accept a helical wire insert; a helical wire insert with an external thread that mates with the internal threads of the thread bore, and internal threads that are compatible with the specified threads for accepting an externally threaded shaft, said complementary shaft capable of being driven by a given torque into the helical wire insert, and the nut with helical wire insert further comprising a helical wire insert that increases the strength of the fastener over the strength of a nut or a threaded shaft. The disclosed method further comprises a helical wire insert that increases the strength of the fastener assembly over the strength of a nut or a threaded shaft without a helical thread component. Furthermore, the method further comprises a free running nut.

BRIEF DESCRIPTION OF THE DRAWINGS

For a fuller understanding of the nature and advantages of the present invention, reference should be had to the following detailed description taken in connection with the accompanying drawings, in which.

DETAILED DESCRIPTION

Disclosed herein is a new apparatus and associated method for securing equipment to an underlying structural support. In particular, disclosed is a locking fastener embodied as an improved nut useful for providing reliable attachment of components of stationary objects to structural members, where attachments may be subject to vibrational loosening. In a preferred embodiment, the new lock on fastener is used to attach components to communications and electrical service towers.

As disclosed herein such lock on clasp fastener assembly system typically is a nut configured to accept a male fastener, and provide for a desired set of torque tolerances including locking, unlocking, both during installation or removal.

Figure 1:
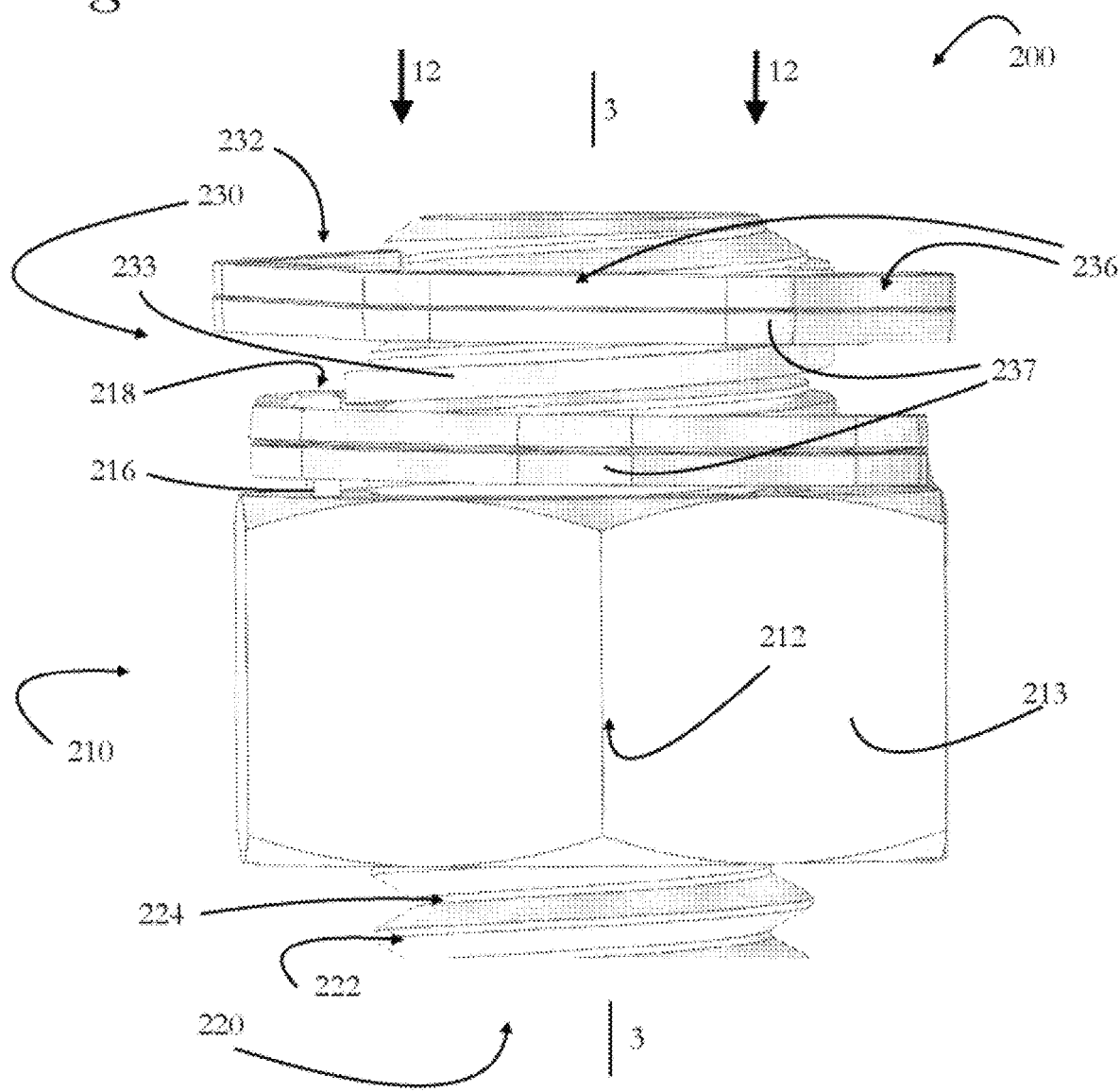
FIG. 1 shows a view of a fastener using the insert system with a Lockone clasp.

FIG. 1 shows a side view of the newly disclosed fastener, that provides a nut body with a lock on clasp component. In FIG. 1, fastener 200 is shown with a nut body, 210, a threaded shaft 220, commonly as a bolt, and a lock on clasp coil 230. Nut body 210 is shown embodied as a hex nut with a series of six points, as at 212, and six faces, as at 213. Nut body 210 is preferably internally threaded to accept a helical thread insert (HTI) within the threadbore and the HTI provides the threads that carry the threads of shaft 220.

Threaded shaft 220 is formed with a series of threads 222, and the threads are comprised of thread lands 222 and thread grooves 224. The thread geometry, as in lands 222 and grooves 224 can be formed in a variety of manners, with many thread geometries commonly used by those skilled in the art.

Shown in the FIG. 1, Fastener 200 has an externally hexagonal shape as is common for machine nuts. Those skilled in the art will recognize that other nut shapes are applicable to the disclosure. The nut body 210 is formed with a thread bore, and the thread bore is tapped to conform to the desired thread pattern. Threads can be formed to fit typically available standard thread inserts, for example, STI threads. As not clearly visible in FIG. 1, a helical thread insert essentially fills the threads of nut body 210. When a bolt or stud is such as threaded shaft 220 is threaded into the fastener, the counter rotation of the insert may be limited by the action of a helical thread insert, depending on the type of insert used. See FIG. 3 for further disclosure relating to the helical thread insert.

The lock-on clasp helix is marketed by Kato Fastening Systems of Newport News, Virginia, USA, as the LockOne™ locking product. The lock-on (Lockone) helix acts as a positive locking retainer that occupies approximately the three terminal threads of the distal end of a threaded shaft. By co-tightening the lock on helix with a nut body the lock on helix prevents the advance of the nut body along a threaded shaft.

Figure 2A:
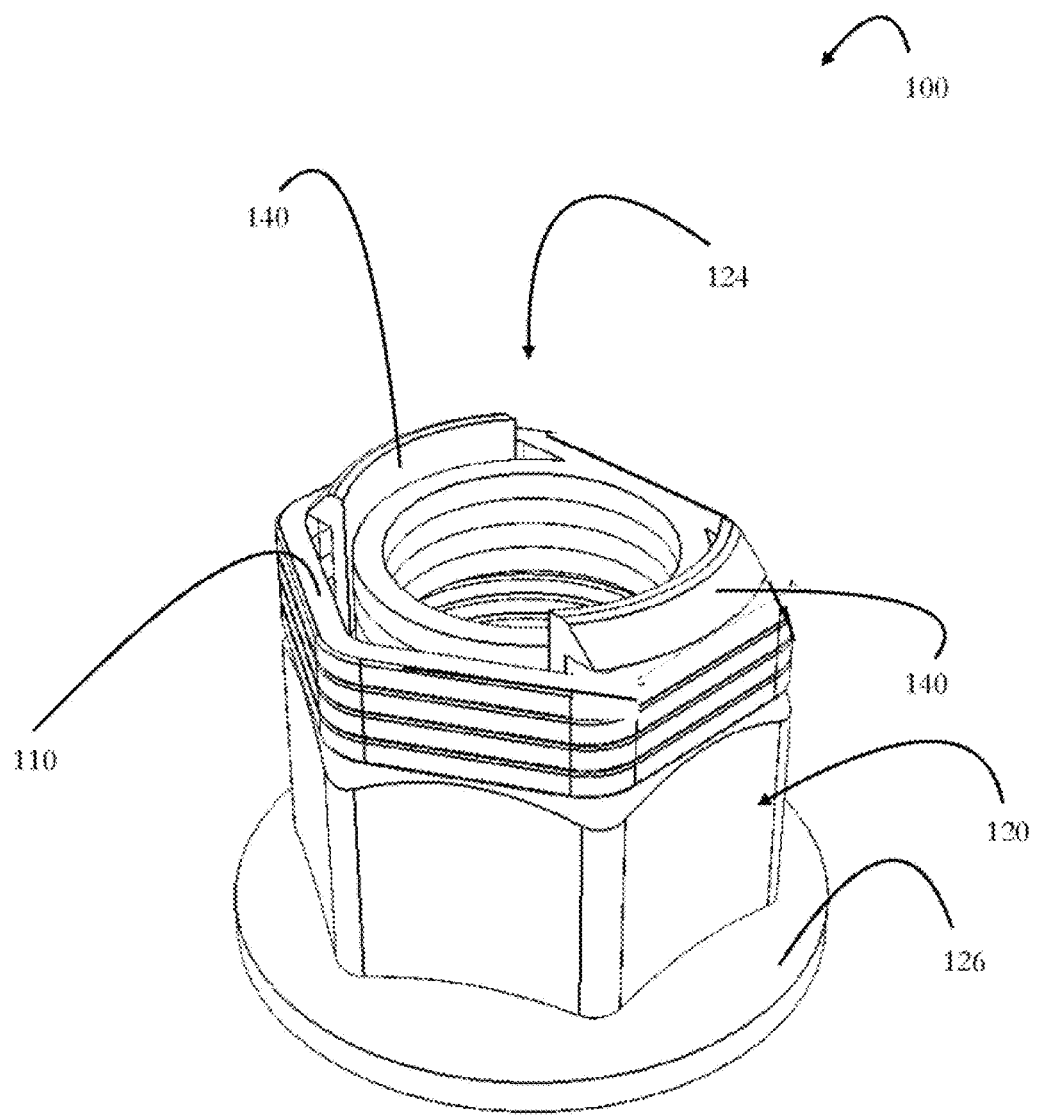
FIG. 2A shows a perspective view of a fastener using a retainer latch and a Lockone clasp.

In FIG. 1 lock-on helix 230 is formed of steel, such as 304 stainless steel WPB, and comprises a coil within a coil. Outer coils 232 provide a series of generally planar flat faces, as at 236, between a series of six vertices, as at 237. When relaxed, the outer coils adopt a hexagonal conformation of the outer coils 232. Inner coils 233 engage within the thread grooves 224, and as they engage such threaded shaft geometric change on the orientation of outer coils 232 is imposed. The result is that the loaded lock on helix adopts a twelve point conformation, with points 212 aligning with arrows 12 aligning between the points of the hex nut body 210. When adopting the "twelve point" conformation, as shown in FIG. 2, the lock on helix is retarded from rotating about the threaded shaft 220. In order to remove a nut body locked by the lock on helix, a twelve point socket is used to counter rotate the upper set of coils so that they align with the inner set of coils, releasing the grip of inner coils 233 from the threaded shaft.

It is a further embodiment of this disclosure that the disclosed nut body provides a feature for retaining the lock on helix to the nut body. Retainer clip 216, as shown in FIG. 2 is machined as part of the process of manufacturing nut body 210. The retainer clip 216 is formed with a throat 217 that accepts the body of Lockone clasp helix 230, and a latch 218 that retains the Lockone clasp helix about the retainer clip throat.

Turning to FIG. 2, a series of views of an alternative embodiment are shown. Fastener 100 has an externally hexagonal shape as is common for machine nuts. Those skilled in the art will recognize that other nut shapes are applicable to the disclosure. The hex nut body 120, is formed with a series of evenly spaced vertices, as a hexagonal nut. A flange 126 is shown at the base (bearing face) of the nut body. The nut is formed with a thread bore, 124. The thread bore is tapped to conform to a desired thread pattern. Threads can be formed to fit typically available standard thread inserts, for example, STI threads. As not clearly visible in FIG. 2, a helical insert 130 essentially fills the threads of fastener 100. A locking or free-running helical insert could be used.

Also shown in connection with the fastener 100 is lock clasp 110, formed of resilient metal material, and marked by Kato Industries as a "LockOne"™ component. In connection with this disclosure, the Kato Lock One component is also termed a "Lockone clasp." When in the conformation shown in FIG. 2, a compressed configuration, the Lockone clasp 110 presents a series of vertices which may align with the vertices of the nut body. The Lockone clasp is retained with the nut body by retainer latches 140. Further, the locking cap can be further covered with a resilient material such as a rubberized sheath. (not shown)

It is an additional embodiment of the disclosure that the nut body may be formed of more than one material. For instance, a molded nut body provided with a stainless steel helical wire insert may perform as well as any nut body formed only of mild steel. In addition, a nut body could be formed with a metal core, such as a steel core, and then be comolded, over molded or impregnated with a plastic filler.

Figure 2B:
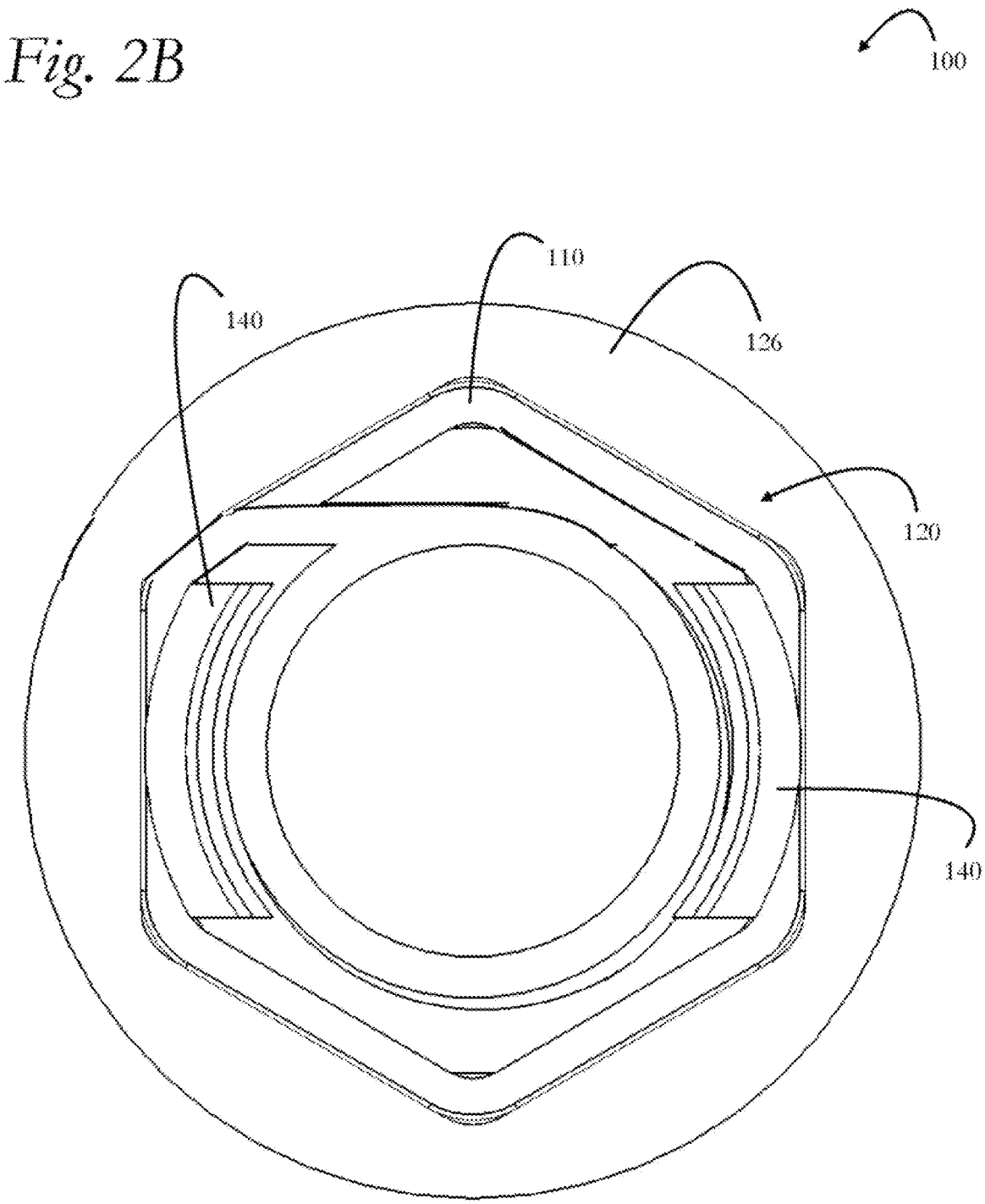
FIG. 2B shows a top plan view of a fastener using a retainer latch and a Lockone clasp.
Figure 2C:
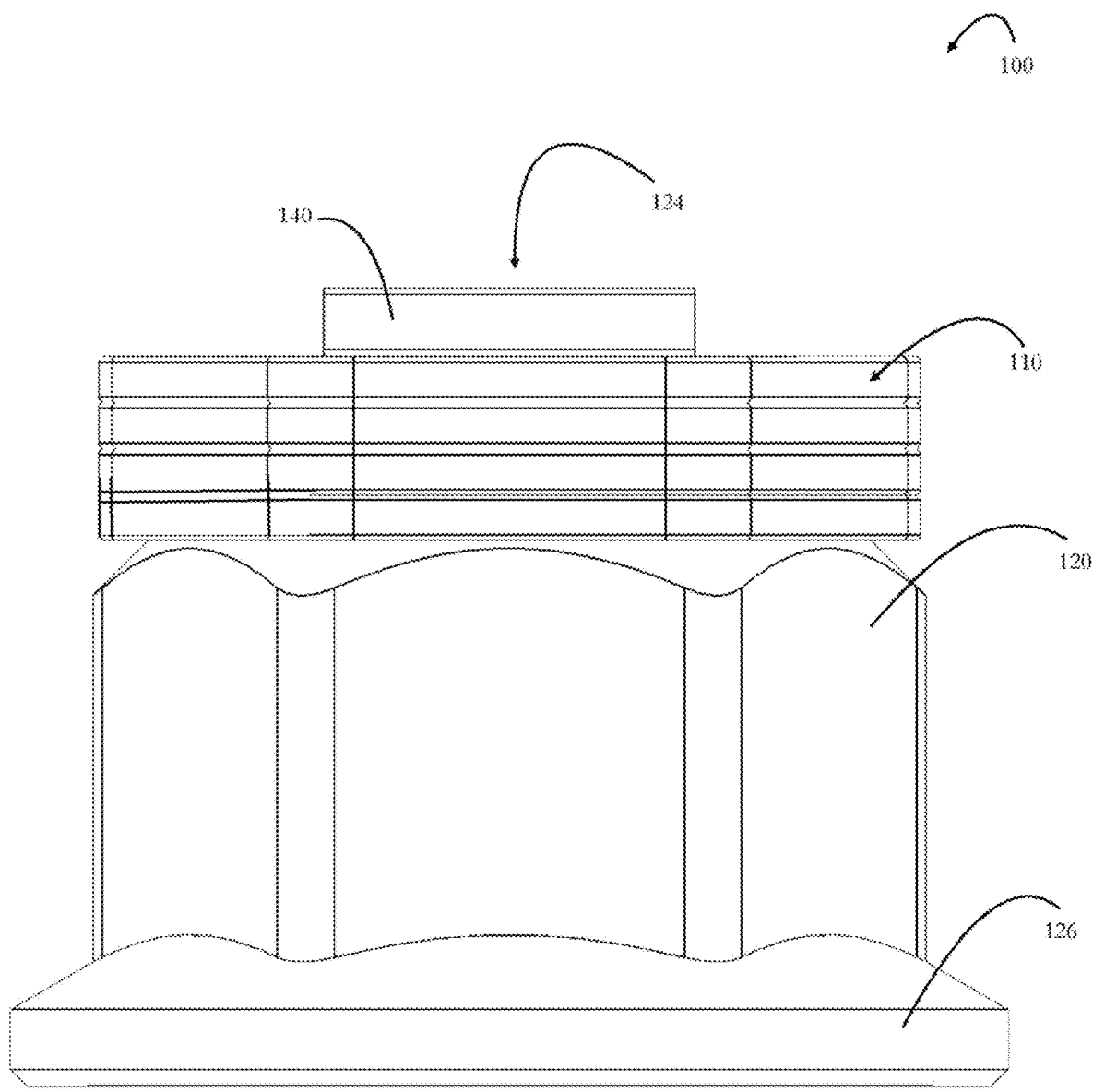
FIG. 2C shows a side elevation view of a fastener using a retainer latch and a Lockone clasp.

FIG. 2B and FIG. 2C show a side view and a top view of the fastener assembly 100, that provides a nut body with a lock on component, to assist in understanding the assembly. Fastener 100 is provided with two retainer latches 140, as L-shaped pawls, that are in an opposed position, and are integrated with the structure of nut body 120. Nut body 120 is preferably internally threaded to accept a helical thread insert (HTI) within the threadbore and the HTI provides the threads that carry the threads of a shaft.

As a bolt is inserted into the assembled locking fastener, such as fastener 100, or fastener 200, rotation of the bolt will engage helical thread insert, if one is installed. FIG. 3 demonstrates the configuration of a helical thread insert in connection with a nut body.

As shown in relation to FIG. 1, an inserted threaded shaft expands an installed helical thread insert to bear against the inner surface of the thread bore. As the bolt advances into the helical insert, additional segments of the helical insert are expanded and bear against the thread bore body. In one embodiment, the bolt is advanced entirely through the helical insert and thread bore body, and is finally torqued to a specified torque. In such case, the characteristics of the helical insert will serve to retain the bolt in position and resist any backing-out of the bolt to a reverse torque specification determinable according to the characteristics of the helical insert. Properly installed, the helical insert will bear against both the bolt and the thread bore body, retaining the inserted bolt.

In an alternative embodiment, the bolt is inserted only a portion of the depth of the helical insert, and the portion of the helical insert that is bearing against the bolt and the thread bore body will retain the bolt to a determinable reversing torque.

A threaded insert that utilizes established thread geometry, such as "Standard Thread Insert" (STI) or met common thread standards would be an advantage, as it would not be necessary to utilize specialized threads, or specialized tools or gauges for using any such specialized threads.

If utilizing an insert to provide prevailing torque retention, it should be immediately apparent to a technician that a prevailing torque insert is in use. Moreover the insertion torque due to the retention insert should be measurable along with the insertion torque of the fastener itself. In certain applications, it is necessary to utilize a gasket material between two mating surfaces. The retention insert should provide for maintaining locking action throughout a range of compression of gasket material.

FIG. 3 shows a series of views to assist in understanding of the use of a helical thread insert with the new fastener system shown. FIG. 3A shows a perspective view of a locking fastener with a helical insert, embodied as a nut. Fastener 1000 has an externally hexagonal shape as is common for machine nuts, with nut faces 1002-1007. Those skilled in the art will recognize that other nut shapes are applicable to the disclosure. The nut body 1012 is formed with a thread bore, 1010, (also referred to as a thread bore body 1012) by drilling or hot pressing. The thread bore is formed by tapping, machining or roll forming to conform to the desired thread pattern. Threads 1020 can be formed to fit typically available standard thread inserts, for example, STI threads. As shown in FIG. 3A, helical insert 1030 essentially fills the threads of fastener 1000 thread bore 1010 threads 1020. When a bolt or stud is threaded into the fastener, the counter rotation of the insert may be limited by the action of the helical thread insert, if such insert is a prevailing torque HTI (See FIG. 3C-F). The thread insert is commonly inserted by use of a tool. In fastener 1000, the HTI is trapped in the thread bore by a physical barrier, such as detent 1040, or other obstruction.

Figure 3A:
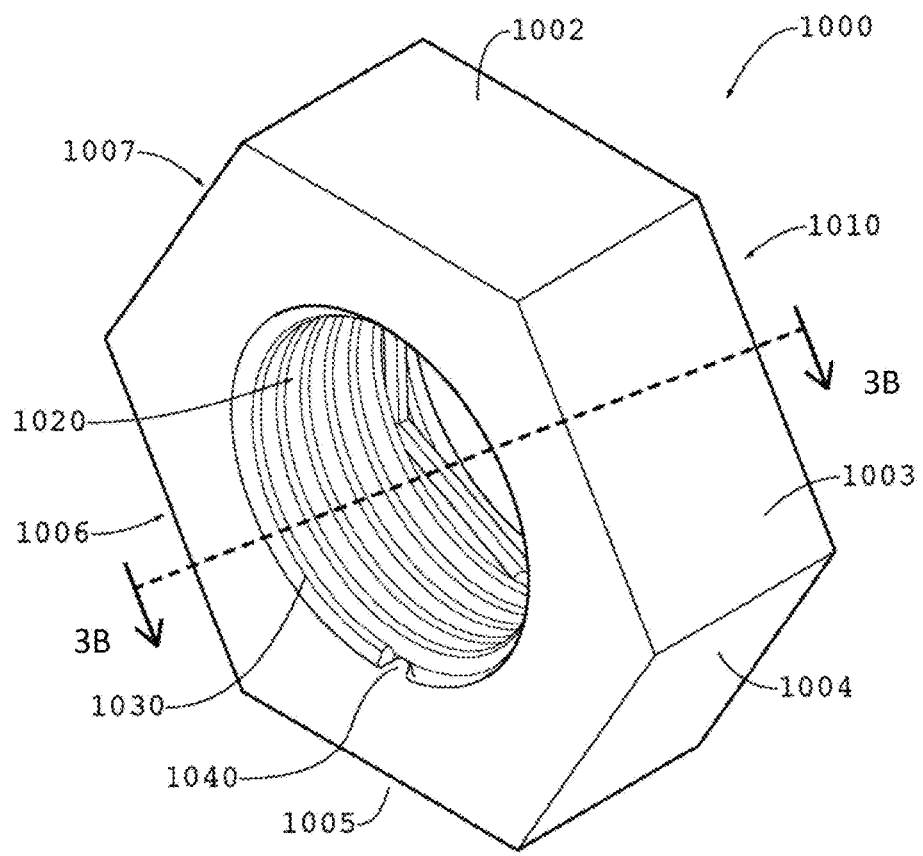
FIG. 3A shows a perspective view of a locking fastener and a helical thread insert components for use with the fastener assembly.
Figure 3B:
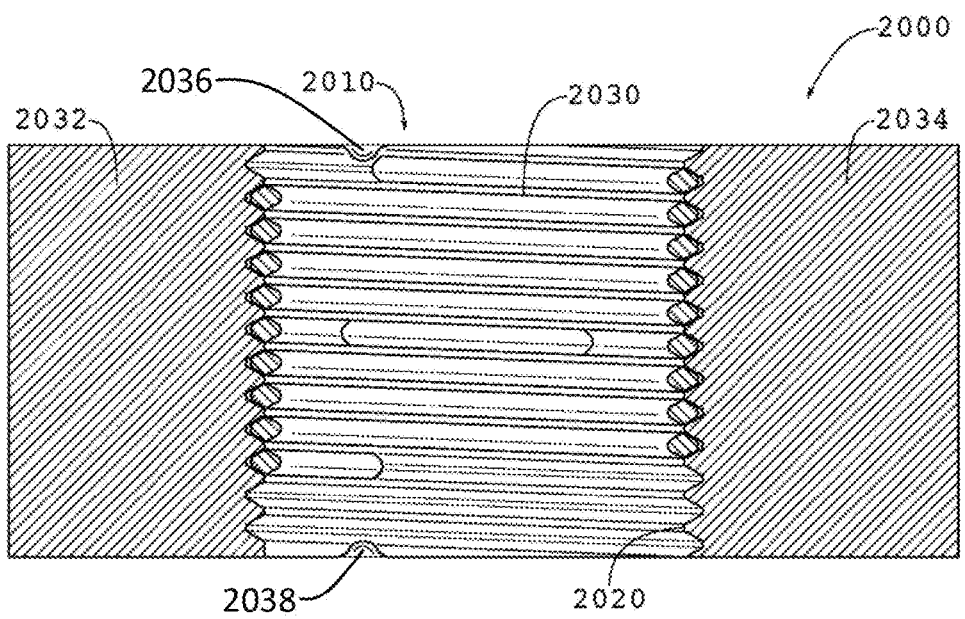
FIG. 3B shows a cross-sectional view of a locking fastener and a helical thread insert components for use with the fastener assembly.

FIG. 3B shows a cross section of an exemplary fastener, as if sectioned along line 2-2 of FIG. 3A. Fastener 2000 is provided with a helical insert 2030 that occupies only a portion of the depth of the fastener. Fastener 2000 is penetrated by thread bore 2010, and the thread bore 2010 has been tapped to provide threads 2020. Helical insert 2030 may be selected from a wide range of available helical inserts to occupy approximately ½ of the depth of thread bore 2010. As such, the fastener 2000 provides both material of the fastener nut body itself at region 2032 to hold a bolt or stud, a thread insert portion at 2030 and a locking portion at region 2034 to retain an inserted bolt. Detents 2036 and 2038 can be formed after insertion of the helical thread insert, trapping the HTI within the thread bore, but allowing relaxed travel about the threads by the thread insert. Detents 2036 and 2038 are formed for example, but not limited to, by upraising a segment of the thread bore, interrupting the thread bore, or by affixing barrier material (such as by spot welding) about the threads forming the inner surface of the thread bore.

Helical thread inserts can act as prevailing torque locking nuts depending on the HTI used in a particular application. FIG. 3C-F show one version of such an insert that will act as a prevailing torque HTI when used with the fastener systems disclosed. FIG. 3A shows a perspective view of such an HTI. Insert 300 is formed of polygonal wire, so that the insert presents an internally threaded threadbore, 320, of threads 322 with a series of HTI faces, 324-329 (for example), which project into the final threadbore. The HTI is formed in the typical application with external threads 330 remaining compatible with an STI thread. The side view in FIG. 3B shows a generally cylindrical HTI, with the threads 330 being interrupted by modified threads, as indicated at 325-327. As shown in FIG. 3, a selected portion of the threads can be modified to change the running characteristics of the internal threads of the HTI (and also to a modifiable extent to the external threads 330). A wide variety of internal threads are available, such as those from Kato Fastening Systems, with differing characteristics of back out and prevailing torque resistance.

Figure 3C:
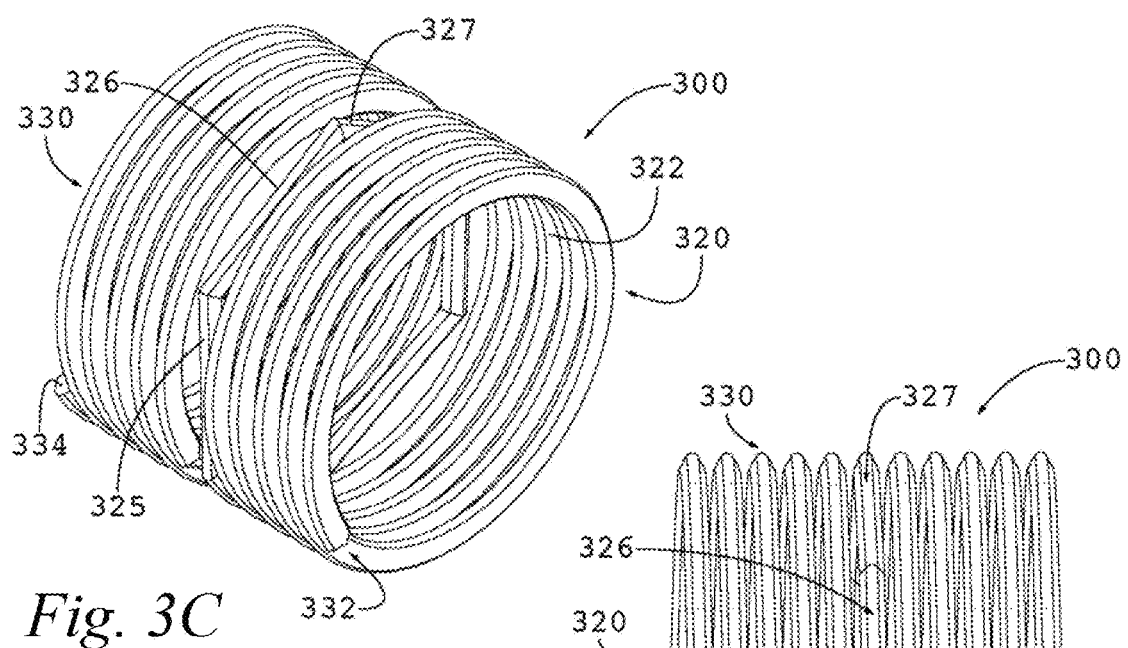
FIG. 3C shows a perspective view of a helical thread insert component for use with the fastener assembly.
Figure 3D:
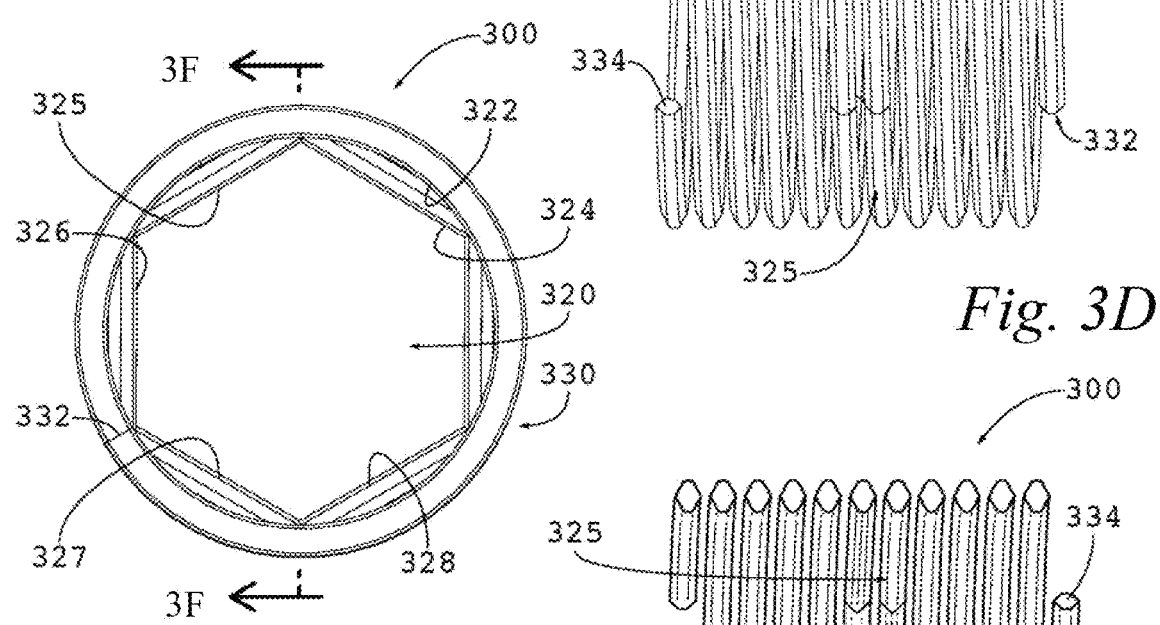
FIG. 3D shows a side elevation view of a helical thread insert component for use with the fastener assembly.
Figure 3E:
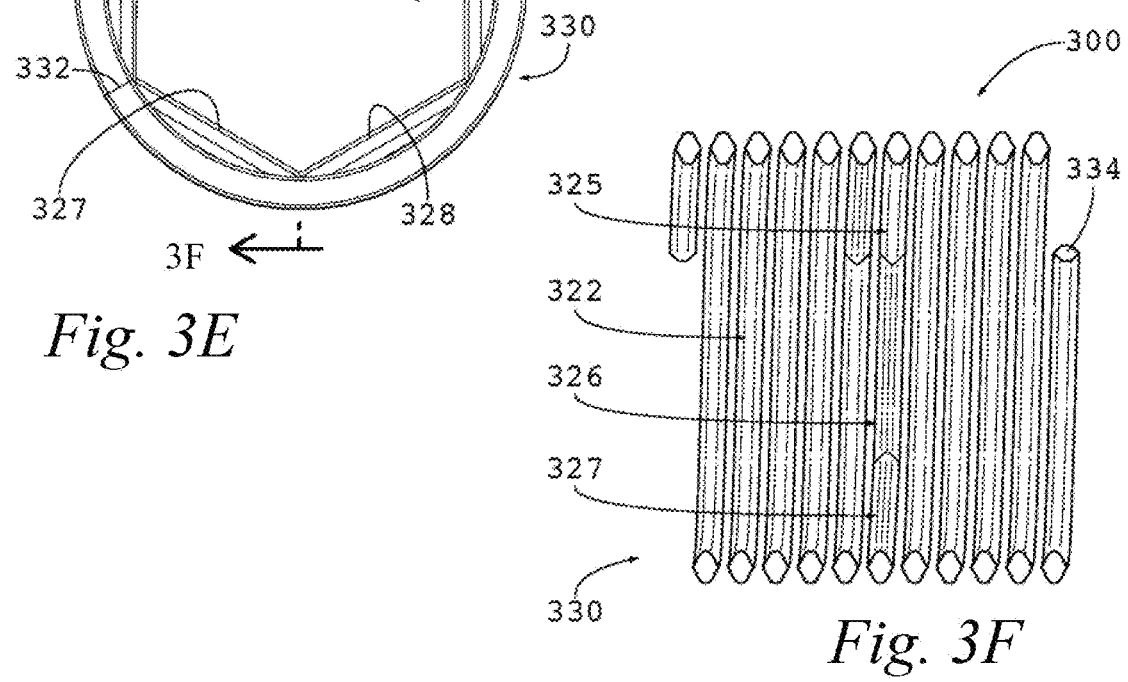
FIG. 3E shows a top plan view of a helical thread insert component for use with the fastener assembly.
Figure 3F:
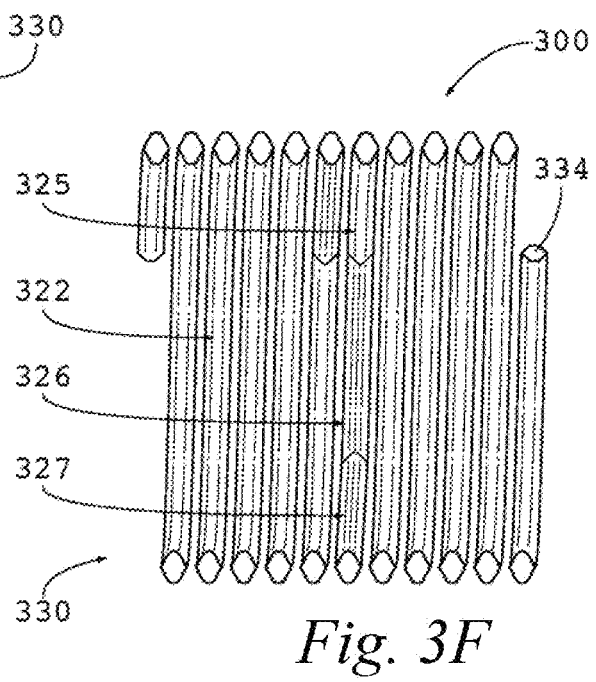
FIG. 3F shows a cross-sectional view of a helical thread insert component for use with the fastener assembly.

An end view of a prevailing torque locking HTI is shown in FIG. 3C, and a cross sectional view in FIG. 3D. From the top view shown in FIG. 3C, the internal threads 322 of threadbore 320 combine to create a generally circular end profile, with the HTI prevailing torque faces 326-329 interrupting the smooth profile of the internal threads. In practice, the characteristics of a helically threaded insert, such as insert 300 installed in a nut body such as fastener 1000, will serve to retain an inserted bolt in position and resist any backing-out of the bolt to a reverse torque specification determinable according to the characteristics of the helical wire insert. Properly installed, the helical insert will bear against both the inserted bolt and the threads within thread bore body, thus resisting the initial back-off movement and further retaining the inserted bolt against a reverse prevailing torque.

Helical inserts have been used for some time in industry for applications that substantially differ from those disclosed, including, for instance, as a means to repair damaged threads. A variety of such specifications and applications are provided by the manufacturer of helical wire inserts, such as from Kato Fastening Systems, Inc. Helical coil inserts are helically-wound inserts that function in fasteners to provide durable screw threads. Kato brand "CoilThread"™ Inserts are made of cold-rolled No. 304 stainless steel wire (AS7245), work-hardened to a tensile strength above 200,000 psi, and a hardness of Rc 43-50. Kato CoilThread inserts are available in a variety of wound thread sizes including Unified Coarse (UNC), Unified Fine (UNF) and Metric thread sizes. It should be apparent to those skilled in the art that these thread types are only some of the variety of helical coil inserts. When helical coil inserts are assembled in "STI" (Standard Thread Insert) tapped holes, helical coil inserts can form standardized Unified Coarse (UC) or Unified Fine (UF) threads that conform to National Bureau of Standards Handbook H-28, and meet screw thread standards according to U.S. Federal classification. Helical coil inserts can also be produced that fit a variety of other thread standards, such as for instance, will also accommodate UNJ, MIL-S-8879, and male threaded fasteners. Further examples are shown in the 2015 CoilThread Inserts and Tools product catalog of Kato Fastening Systems, Inc. of Newport New, VA. As described below, the selection of a particular helical thread insert (HTI) may be based on the particular application for which a fastener is intended. Certain thread inserts may be configured with a geometry that is suited for use as a locking HTI. Other insert geometry may be better adapted for a free-running HTI.

FIG. 4 shows a series of views of one embodiment of the disclosure, identified as fastener 400. The identified components in FIG. 4 are called out and described below. Nonetheless, to assist the comprehension of the disclosure, the identified components are also identified herewith as follows: fastener 400; nut body 410; base flange 412; nut body hex face 414; nut body hex face 416; Lockone clasp 420; Lockone outer ring 422; Lockone inner ring 424; Lockone thread ring 426; transition arm 428; lock retainer 430; variant lock retainer 432; helical thread insert 435; and threadbore 440.

Figure 4A:
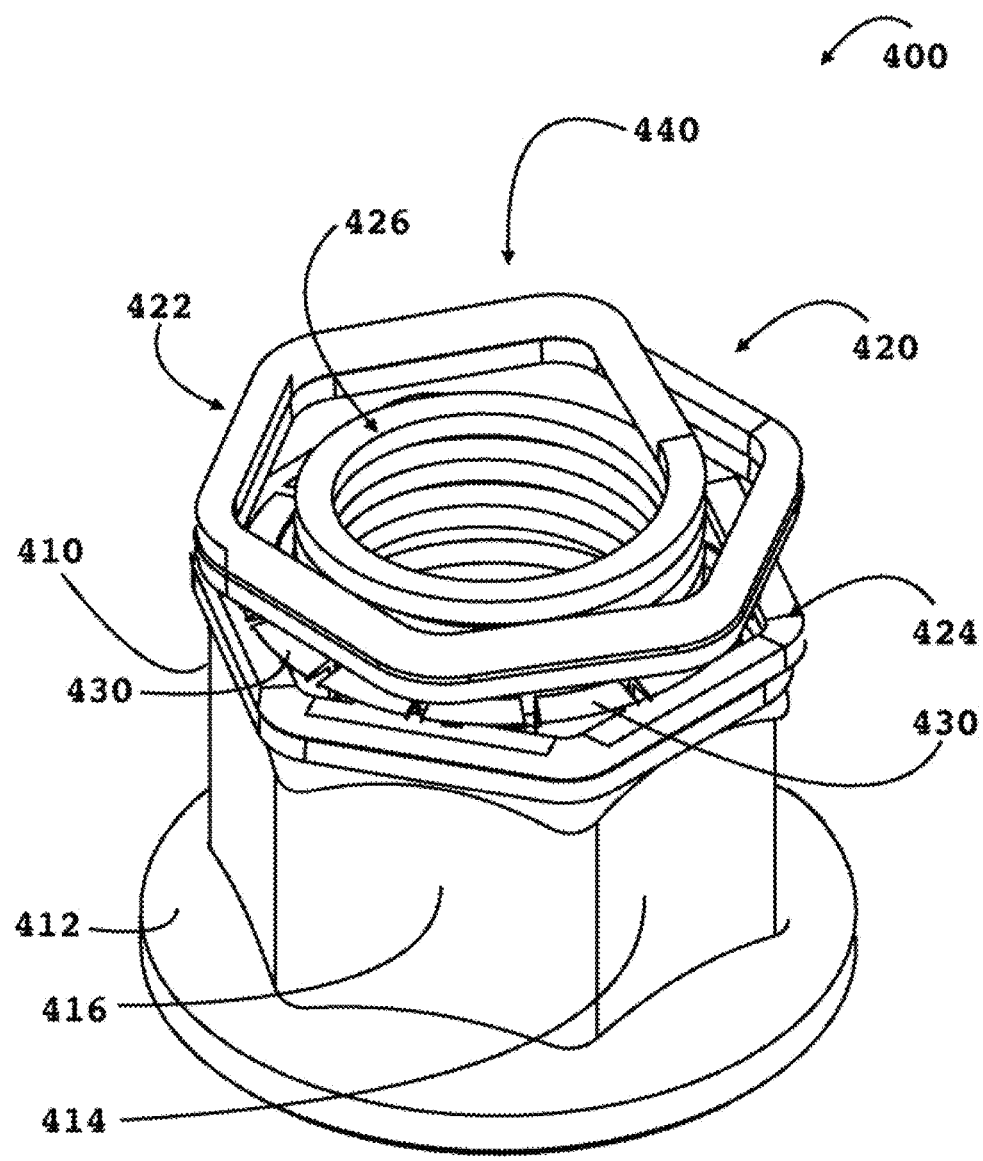
FIG. 4A shows a perspective view of the components of the Lockone fastener system.
Figure 4B:
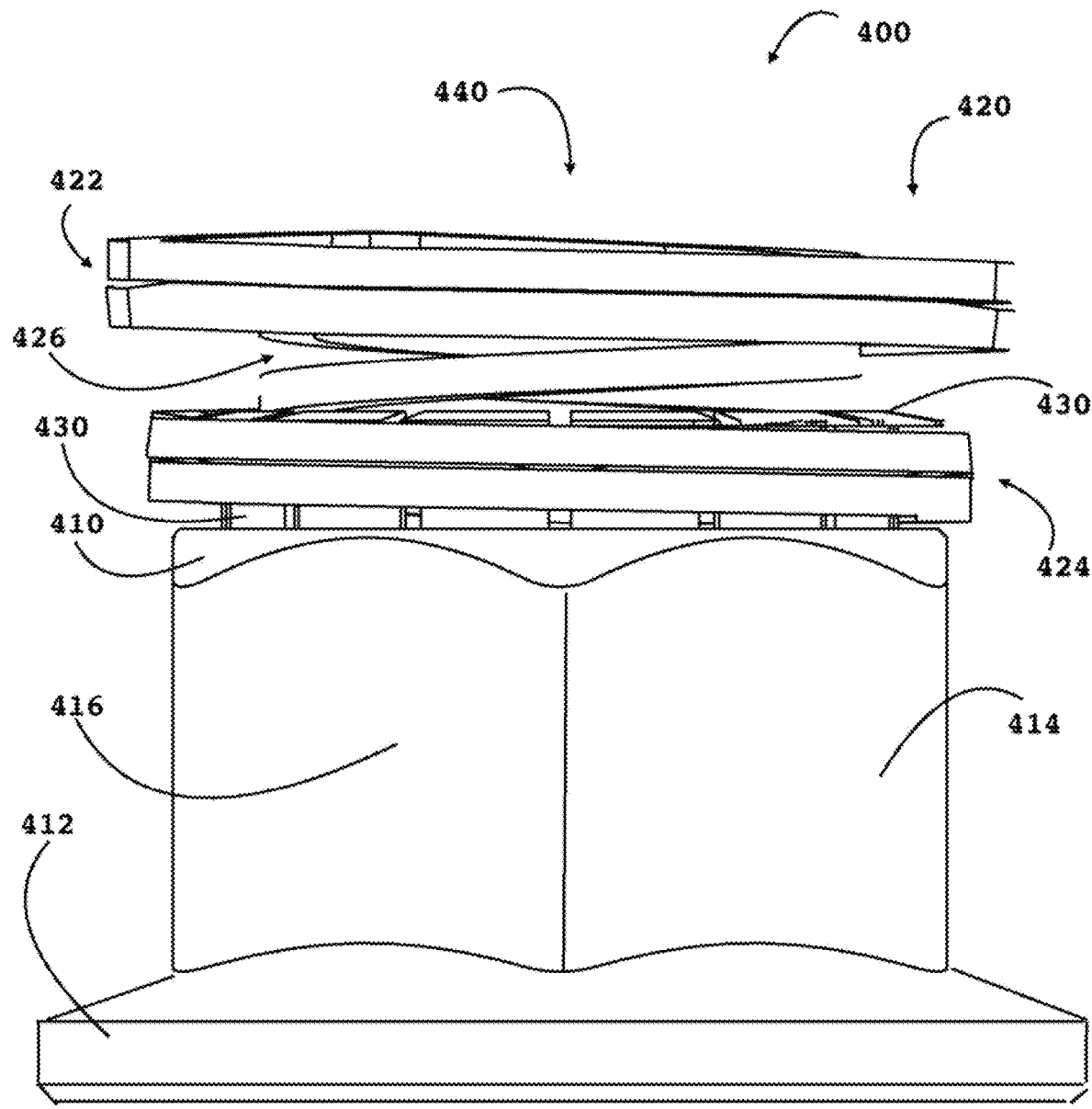
FIG. 4B shows a side elevation view of the components of the Lockone fastener system.
Figure 4C:
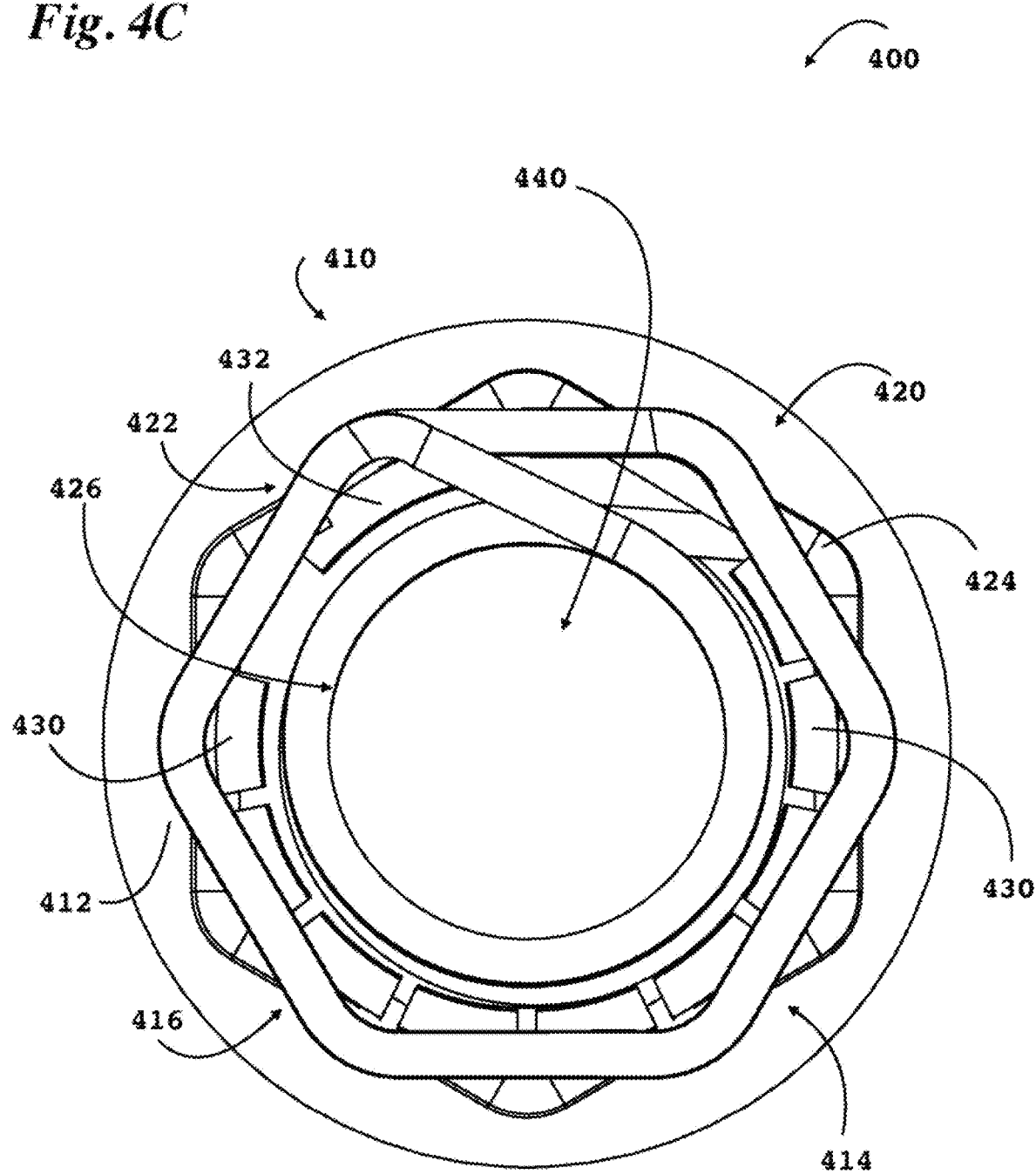
FIG. 4C shows a top plan view of the components of the Lockone fastener system.

FIG. 4A shows a perspective view of the fastener 400 with a nut body and Lockone clasp. The fastener is formed with a hexagonal nut body cylinder, with a base flange portion 412 of nut body 410. Nut body hex faces 414 and 416 are exposed to view and are accessible to the tool, such as a socket or nut driver used with the fastener. Fastener 400 surrounds a thread bore 440, the thread bore bearing internal threads essentially filled by a helical thread insert that is hidden from view in FIG. 4A. The fastener 400 consists essentially of Lockone clasp 420 surmounting and mated to a flanged nut body (as 410) carrying an internally disposed helical thread insert (not shown). The Lockone clasp 420 has an outer ring 422, that alone, and relaxed generally approximates a hexagon, along with an inner ring 424, also generally a hexagonal, connected to a thread ring 426 that bears against a threaded shaft inserted into the fastener. The relative flexing of the inner ring and the outer ring bring force to bear from the Lockone rings against an inserted bolt or stud. To release the grip of the Lockone clasp, and freeing an inserted shaft to turn requires rotation of the inner ring and outer ring relative to one another (by use of a 12-point socket, for example) and relaxing the forces applied to the thread ring.

The present disclosure combines a Lockone clasp, integrated with a nut body, and a helical thread insert. If a prevailing torque locking helical thread insert is utilized, the fastener 400 will provide a fastener that is equipped to lock at a predetermined prevailing torque, and also be clamped in place by the action of a Lockone retainer. As will be further described, along with the following figures, fastener 400 provides retainers that wed the Lockone clasp to the nut body.

In many situations, the redundant locking mechanisms would not be necessary. In certain high demand situations, a locking approach that provides a prevailing torque locknut, and the positive locking security of the Lockone clasp is warranted. In one example of such a high-demand application, communication towers that are bolted together from modular components may demand such extra security. In one example of such a communication tower, a tower installed in a generally inaccessible location such as a mountain side or building roof, can with the proper equipment be quickly assembled and torqued to a predetermined specification. Such towers may be exposed to sever elements, and subject to high wind forces. On some occasions, wind forces combined with harmonic flexing of the structure under load can over time, loosen connecting bolts that were initially torqued to specification. Failure of threaded connections in such communications towers can create a disastrous combination, with an important tower collapsing, causing loss of service, property damage and injuries, and lead to significant recovery costs.

Figure 4D:
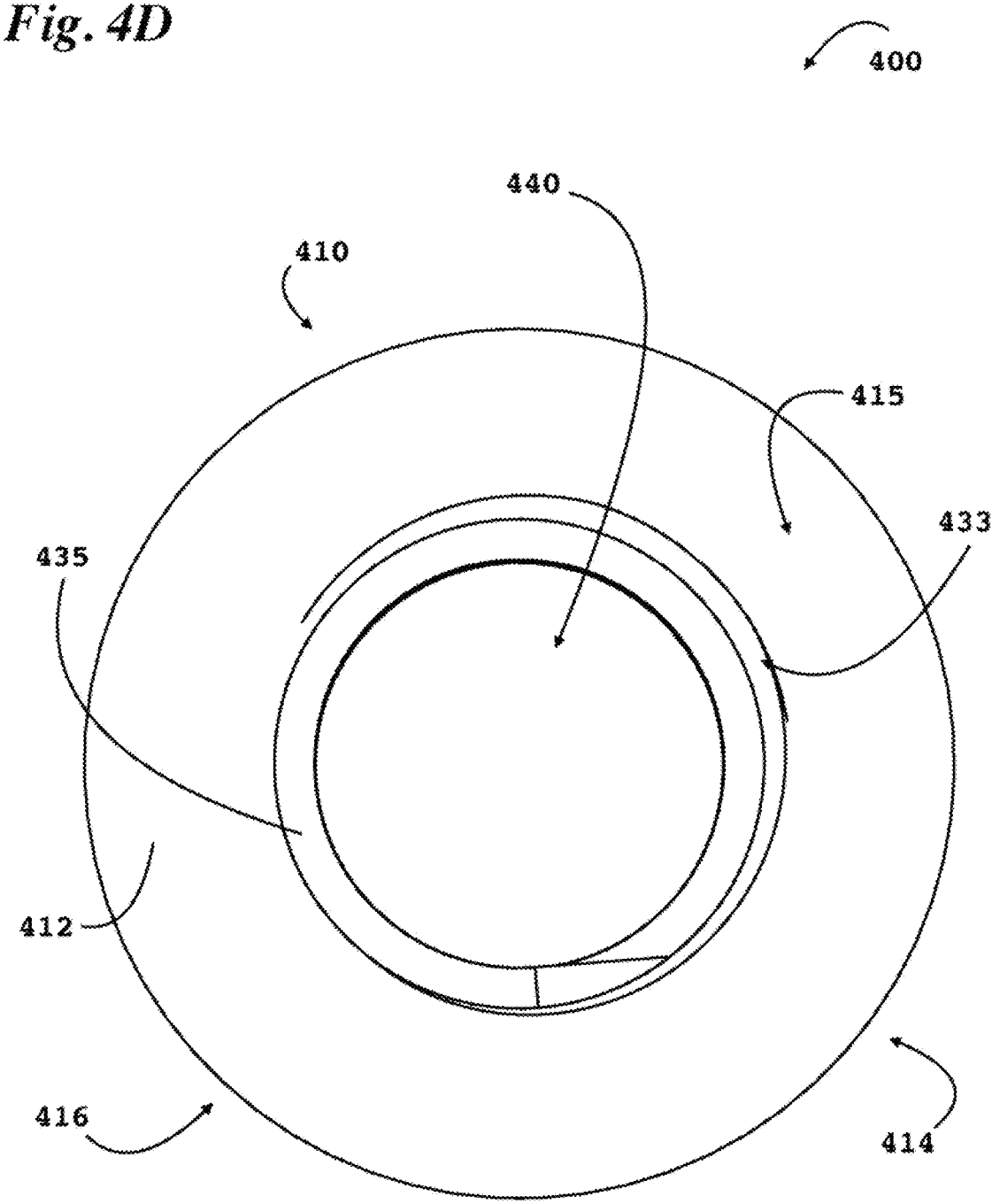
FIG. 4D shows a bottom plan view of the components of the Lockone fastener system.
Figure 4E:
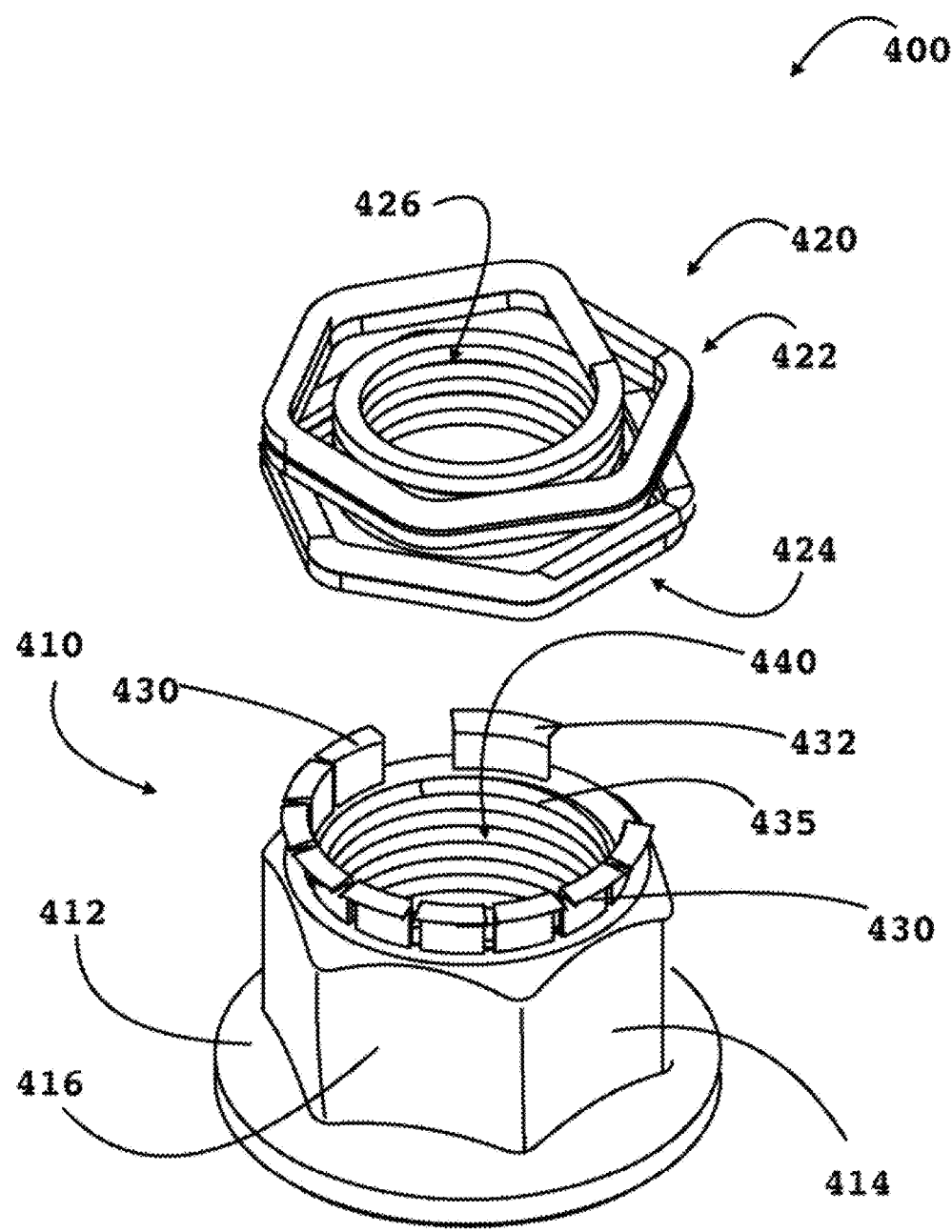
FIG. 4E shows an exploded perspective view of the components of the Lockone fastener system.

The exploded view in FIG. 4E reveals the Lockone retainers, shown by way of example at 430 and 432. As shown in FIG. 4E, the retainers are essentially formed as an integral clip projecting from the exposed face of nut body 410 (as opposing the bearing, or flange face). Retainers 430 are shown as a series of similarly sized and disposed pawl shaped clips, attached to the nut body, and arrayed about an approximately 270 degree arc around the edge of the thread bore. Free standing retainer clip 432 is shown as being wider, for instance, than the individual clips 430, and disposed in a location generally equidistant from the separated retainer clips 430. As shown, each of clips 430 occupy generally 30 degrees of the edge of thread bore 440. Fewer or wider clips with a deeper projection may be adaptable for particularly favored embodiments. The function of retainers 430 and 432 is to hold the Lockone clasp in place, while allowing for the clasp to flex about the nut body as the outer ring and inner ring move relative to one another and the thread ring. It is considered important, if not essential that the presently disclosed form of Lockone clasp is formed with a transition arm, as at 428 (along with an inner transition arm hidden in the view in FIG. 4E) that must connect the inner ring to the thread ring.

In FIG. 4D, fastener 400 is shown from a bottom or flange side view. Fastener 400 is formed with a thread bore 440, with internal threads 433, partially filled by helical thread insert 435. The fastener is typically expected to be installed unidirectionally, with the flange face 415 of base flange portion 412 of nut body 410 being drawn into a close apposition with a structural member, or intervening washer. Nut body hex face 414 and 416 are hidden by the flange in this view, as is the Lockone clasp 420.

Turning to FIG. 4E, an exploded perspective view of the fastener 400 is shown. The fastener is formed with a hexagonal nut body cylinder, with a base flange portion 412 of nut body 410. Nut body hex faces 414 and 416 are exposed to view in this view. Fastener 400 is formed with a thread bore 440, with the internal threads of threadbore 440 shown as essentially filled by a helical thread insert 435. As previously described, the fastener 400 consists essentially of lock one clasp (see 420) mated to a flanged nut body (as 410) carrying a helical thread insert (as 435). The Lockone clasp 420 has an outer ring 422, generally as a hexagon, an inner ring 424, also generally a hexagon, connected to a thread ring 426 that bears against an inserted threaded shaft, such as a bolt or stud.

The exploded view in FIG. 4E reveals the Lockone retainers, shown by way of example at 430 and 432. As shown in FIG. 4E, the retainers are essentially formed as an integral clip projecting from the exposed face of nut body 410 (as opposing the bearing, or flange face). Retainers 430 are shown as a series of similarly sized and disposed pawl shaped clips, attached to the nut body, and arrayed about an approximately 270 degree arc around the edge of the thread bore. Free standing retainer clip 432 is shown as being wider, for instance, than the individual clips 430, and disposed in a location generally equidistant from the separated retainer clips 430. As shown, each of clips 430 occupy generally 30 degrees of the edge of thread bore 440. Fewer or wider clips with a deeper projection may be adaptable for particularly favored embodiments. The function of retainers 430 and 432 is to hold the Lockone clasp in place, while allowing for the clasp to flex about the nut body as the outer ring and inner ring move relative to one another and the thread ring. It is considered important, if not essential that the presently disclosed form of Lockone clasp is formed with a transition arm, as at 428 (along with an inner transition arm hidden in the view in FIG. 4E) that must connect the inner ring to the thread ring.

As described herein, composite fasteners are considered a composite of more than a single component. For instance, common machine nuts are formed of a metal such as mild steel, and comprise only a single component. A coating, such as zinc plating, as considered in the present disclosure is not a composite fastener. The Lockone locking nuts, as shown in FIG. 1 and FIG. 4, for instance, are composite fasteners in the terms of the present disclosure as such a nut is a composite of two or more individual components. A nut could be formed with an inherent thread bore, retainer clips, and an installed Lockone clasp, and as such is a composite of two physical components. Another nut, such as nut assembly 400 of FIG. 4, is a composite of a nut body, a helical thread insert, and a Lockone clasp. Prior to the present disclosure, there has been no enabling disclosure of any kind that discloses such a three element composite fastener.

The present disclosure is further amenable to adaptation to nut bodies formed of multiple materials, and are composite fasteners further comprised of a nut body core, and a lightweight formed matrix completing the nut body. Such as composite fastener can be comprised of a composite nut body, with the addition of a helical thread insert, and the installation of a Lockone clasp element.

The composite nut bodies of fasteners as described could be formed to be "ultra lightweight," as either a free running nut or as a nut with a helical thread locking insert as a locknut. Such nut bodies (nuts) comprise hybrid metal and plastic nut. The metal, such as hardened steel or steel alloy can provide the structural framework, and the final shape be formed by a plastic "layers." There can be multiple layers of plastic or composite material that fill the space between metal wafers. Nut body materials can be aluminum, steel/alloy steel and corrosion resistant steels (e.g., stainless steels).

In yet another embodiment, the spaces between metal wafer layers can be left open rather than over-molded with a plastic. In some compositions of plastic the over molding plastic would only add additional cost without any significant structural benefit (other than appearance). The locknuts forms of such fasteners would include locking helical wire inserts and the "non-locking" nuts would use free running helical wire inserts.

In still another embodiment, the nut body is formed entirely of plastic, except for the helical wire inserts for the running threads. Such composite nuts can be formed with either locking and free running HTI's. Certain plastic nuts could be solid plastic and look like traditional nuts (only with the nut body made from plastic) or also be ultra light weight versions with wafer layers of plastic, as described above.

Nuts formed only of plastic or composite material with helical wire inserts are believed to provide the capability for the highest strength-to-weight nuts available in any market. In addition, the HTI nuts provide a much more consistent lock and torque characteristics than mechanically crimped or plastic insert nuts currently available. Thus these fasteners can maintain acceptable prevailing torques over more installation cycles as compared to conventional material nuts. An additional benefit is corrosion resistant benefits because of the stainless steel helical wire inserts are not corrodible, and the plastic nut body is not subject to ferro-oxidation either.

Existing locking fasteners are often characterized as either "positive locking" or a "prevailing torque" locking fastener. In a positive locking fastener, the threaded on portion of the fastener, typically a nut, is mechanically held in its prescribed position by some type of mechanical locking feature. For the nut to be released, or backed off from its specified final position, in a positive locking fastener, some mechanical failure must occur, such as shearing of metal, or displacement of retainer pin.

A prevailing torque mechanical fastener utilizes a specified torque or opposed frictional force to lock the fastener in place. Plastic inserts, such as a Vespel insert in a nut, offset locking washers, or crimped deformation fasteners are common examples of prevailing torque locking fasteners. As disclosed herein, the helical insert functions as a new category of prevailing torque locking fastener.

Another existing type of locking nut fastener comprises a nut that has been provided with a thread barrel that is a shape other than round, in particular, an oval thread barrel. One current method of creating an oval thread barrel is to distort, or "crimp" a circular cross section nut barrel to a specified torque, distorting the round cross section to an oval cross section. Such crimped fasteners can function as a prevailing torque locking fastener, but have a number of limitations. These limitations include the difficulty in starting the crimped nut on the thread of a bolt, due to the distortion of the circular cross section. Nuts which are crimped at the time of use may be essentially destroyed by improper or over crimping. Furthermore, it is difficult to reproducibly create a desired fastener that performs within a narrow desired range of prevailing torque. In these fasteners, the amount of back-off resistance (i.e. the prevailing torque of the fastener) is difficult to control and lacks consistency between different lots of crimped fasteners, and between installation events or between different technician installers. See for instance, Barrett, R. T., "Fastener Design Manual," NASA Reference Publication 1228, March 1990.

Another type of crimped fastener utilizes three-point crimping (usually used on a larger sizes of nuts). Theoretically more points for crimping are possible (for example four, or even more).

It is a further embodiment of the disclosed apparatus or device is use of a helical insert as a locking feature for female self-locking fasteners in lieu of other traditional methods such as crimping (oval and three or more point-) in order to deliver more consistent torque performance of the fasteners within the specimens of a given production batch. Such use of the new system provides for a reduced scrap rate of fasteners, better maintainability of installed fasteners, and less risk of material performance issues such as micro crack or hydrogen embrittlement for instance. Implementation of the disclosure allows for the elimination negative production issues, such as double crimping, unnecessary additional sorting or the like.

The helical thread insert of the current disclosure can be a full substitute for crimped locking fasteners, and minimize the existing problems with starting the fastener on a threaded shaft caused by the tolerances resulting from crimping of the fastener into an oval shape.

In accordance with the present disclosure, helical inserts for locking fasteners can be utilized with a variety of types of fasteners. In addition, the same or similar fasteners are used in a variety of situations, such as industrial equipment, farm equipment and other equipment where vibration and motion control is required.

These current systems are generally unacceptable because of the expense of the locking inserts and difficulty in installing the locking Vespel insert. An additional difficulty in using such inserts is the need for the bolt fasteners driven into the insert to maintain the specified torque tolerance when in use in an environment that imposes a wide range of temperatures and vibration patterns. As such a locking mechanism is considered important. Currently, the only effective locking or retaining system available for floating inserts is a collar made of resilient material, such as Dupont Vespel™.

It should be recognized that the fasteners system disclosed is applicable to a method of attaching components by providing a fastener that includes a thread bore internally threaded to accept a helical wire insert, inserting a helical coil wire thread insert with an external thread that mates with the internal threads of the thread bore, and internal threads of the insert that are compatible with an externally threaded bolt and capable of being driven by a given torque into the helical thread insert, with the helical thread insert resisting the backing out of the driven insert with a torque greater that the given torque for driving the threaded shaft into the helical thread insert.

An unexpected result was obtained during the development of the present apparatus and method of implementing locking fasteners using a HTI. In order to qualify newly developed fasteners for use in aircraft, a performance protocol must be met and confirmed by testing of given lots of fasteners. It is a preferred embodiment of the present disclosure that the use of a helical thread insert provides a much higher fastener strength profile than was expected, and in addition a more consistent repetitive torque profile than could be obtained by any existing qualified fastener. The implementation of a HTI with locking feature, created a larger thread bore in the fastener nut, and a stainless steel HTI insert in the thread bore created the fastener threads that would bear against and carry a threaded shaft (i.e. bolt or stud). During strength testing of the new fastener structure, it was found that the fastener strength was substantially and unexpectedly increased. In addition, the torque profile of the fastener was significantly more consistent over the 15 cycles of insertion and removal for testing.

The present disclosure is further embodied in a method for manufacturing improved threaded fasteners comprising a nut complementary with a threaded shaft, such as a bolt or stud. The method comprises providing a fastener body that includes a nut body with a thread bore, the thread bore then being internally threaded to accept a helical wire insert, i.e. with an HTI thread. Such process can be automated, and either a rolled thread or tapped thread provided (for instance). Next a helical wire insert with the characteristics selected for a particular application is chosen, so long as the HTI has an external thread that mates with the internal threads of the thread bore. The HTI may be tanged or tangles, and further provided with locking surfaces or be free-running in certain uses. The HTI provides internal threads that are compatible with the specified threads for accepting an externally threaded shaft, a bolt or stud or other shaft desired for use with the fastener. The complementary externally threaded shaft is thus capable of being driven into the fastener by a given torque by threading into the helical wire insert. The nut body with helical wire insert functions as a nut for fastening parts, with the added benefit of further comprising that the helical wire insert increases the strength of the assembled fastener over the strength of a nut or a threaded shaft made of a single material. Such nuts and fastener combinations can be optionally manufactured to be either locking, or alternatively free running.

The method of manufacturing barrel nuts and other fasteners with a provided HTI is superior to the methods using a resilient insert. Resilient insert nuts in general must have a counterbore recess machined into the distal portion of the nut to act as a receptacle to hold the resilient insert. Such manufacture requires precise machining tolerances associated with the counterbored dimensions. Further, the resilient insert must be machined to a complementary size within acceptable tolerances. The resilient insert routinely must be placed in the counterbore by hand and then a roll over or crimping operation is utilized to physically hold the insert in place. The crimping operation is relatively imprecise and excessive crimp leads to a higher drag on an inserted bolt, along with higher prevailing and break-away torques and higher wear rate. As a result, resilient inserts often may not remain within specification for a prescribed 15 cycles life.

Fasteners supplied for aircraft manufacture and renewal must meet stringent quality specifications. Customers may require 100% of a batch sample of fasteners from each manufacturing lot pass a 15-cycle torque profile test with the fasteners required to meet a not-to-exceed minimum and maximum torque values for a 15 cycle test profile. Performance of the batch sample testing is very slow, labor intensive and consequently expensive. Manufacturers of fasteners frequently are unable to qualify a batch sample to pass the 15-cycle torque testing. The resulting batch rejection would result in substantial reworking costs and potentially lot scrapping costs.

The fasteners disclosed herein, i.e. providing nut bodies with a helical thread insert, exhibit far more superior consistency in torque performance testing (both in locking and breakaway torques) not only in specially handled batch samples, but more importantly, throughout the entire population of a given fastener batch.

In the instance that the helical wire insert used in the described fasteners is somehow damaged during installation or removal, the HTI can be readily replaced at minimal cost without the need for replacement of expensive to produce nut body, whether the nut body is formed of stainless steel, Inconel or other material.

Additional benefits and features of the fastener system will be apparent to those skilled in the art. All of the examples should be considered to be for the purpose of assisting artisans in understanding the broad scope of the disclosure, and should therefore not be taken in any limiting sense.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above system without departing from the scope of the invention herein involved, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

I claim:

1. A fastener system, comprising:
   a nut body having an internally threaded bore containing a plurality of bore threads, and having a bore depth, wherein the nut body is formed of aluminum;
   a helical thread insert formed to create a plurality of internal HTI threads and a plurality of external HTI threads, with the helical thread insert received in the internally threaded bore, wherein:
   a) a portion of the external HTI threads mate with a portion of the plurality of bore threads;
   b) a majority of the internal HTI threads are circular threads having a circular end profile; and
   c) at least one of the internal HTI threads is a non-circular thread having a non-circular end profile including at least three straight segments, and the non-circular thread is located between circular threads; and
   d) the helical thread insert the helical thread insert has a Rockwell C hardness of 43-50 RWC.

2. The fastener system of claim 1, wherein the helical thread insert has at least two circular threads on each side of the non-circular thread.

3. The fastener system of claim 2, wherein at least four circular threads are located on each side of the non-circular thread.

4. The fastener system of claim 3, wherein the non-circular thread has at least five straight segments.

5. The fastener system of claim 2, wherein the helical thread insert has an unequal number of circular threads on each side of the non-circular thread.

6. The fastener system of claim 2, wherein the helical thread insert is formed of stainless steel.

7. The fastener system of claim 2, wherein the nut body includes at least one bore obstruction.

8. The fastener system of claim 7, wherein the at least one bore obstruction is a detent formed by deforming one of the plurality of bore threads.

9. The fastener system of claim 7, wherein the at least one bore obstruction includes two bore obstructions, and the helical thread insert is trapped between the two bore obstructions.

10. The fastener system of claim 2, wherein the plurality of bore threads includes no more than 12 threads, and the helical thread insert includes no more than 10 circular threads.

11. The fastener system of claim 2, wherein the nut body has a first end and a second end, the internally threaded bore extends through the nut body from the first end to the second end, the nut body having a hexagonal tool engagement surfaces extending from the second end toward the first end, and the first end having a circular flange with a bearing face and a curved transition region extending toward the second end and intersecting with the hexagonal tool engagement surfaces.

12. The fastener system of claim 2, wherein the helical thread insert is work-hardened to an insert tensile strength of at least 200,000 psi.

13. A fastener system, comprising:
an aluminum nut body having an internally threaded bore containing a plurality of bore threads, wherein the nut body is formed of a nut body material, and the nut body has a first end and a second end, the internally threaded bore extends through the nut body from the first end to the second end, the nut body having a hexagonal tool engagement surfaces extending from the second end toward the first end, and the first end having a circular flange with a bearing face and a curved transition region extending toward the second end and intersecting with the hexagonal tool engagement surfaces;
a helical thread insert formed to create a plurality of internal HTI threads and a plurality of external HTI threads, the helical thread insert received in the internally threaded bore, wherein:
a) a portion of the external HTI threads mate with a portion of the plurality of bore threads;
b) a majority of the internal HTI threads are circular threads having a circular end profile; and
c) at least one of the internal HTI threads is a non-circular thread having a non-circular end profile including at least three straight segments, and the non-circular thread is located between circular threads;
d) the helical thread insert has at least two circular threads on each side of the non-circular thread; and
e) the helical thread insert is formed of a HTI material different from the nut body material, and the helical thread insert having a Rockwell C hardness of 43-50 RWC.

14. The fastener system of claim 13, wherein at least four circular threads are located on each side of the non-circular thread.

15. The fastener system of claim 14, wherein the non-circular thread has at least five straight segments.

16. The fastener system of claim 13, wherein the helical thread insert has an unequal number of circular threads on each side of the non-circular thread.

17. The fastener system of claim 13, wherein the helical thread insert is work-hardened to an insert tensile strength of at least 200,000 psi.

18. The fastener system of claim 13, wherein the nut body includes at least one bore obstruction.

19. The fastener system of claim 18, wherein the at least one bore obstruction further includes a second bore obstruction in the internally threaded bore at the first end, and the helical thread insert is trapped between the two bore obstructions.

20. The fastener system of claim 13, wherein the plurality of bore threads includes no more than 12 threads, and the helical thread insert includes no more than 10 circular threads.

\* \* \* \* \*